(12) United States Patent
Simmers (10) Patent No.: US 7,374,301 B1
(45) Date of Patent: May 20, 2008

(54) STRETCHED MEMBRANE DEVICE

(76) Inventor: Douglas Evan Simmers, 7485 Cheryl Ln. NW., Massillon, OH (US) 44646

( * ) Notice: Subject to any disclaimer, the term of this patent is extended or adjusted under 35 U.S.C. 154(b) by 31 days.

(21) Appl. No.: 10/906,442

(22) Filed: Feb. 20, 2005

(51) Int. Cl.
*G02B 5/08* (2006.01)
*G02B 7/188* (2006.01)

(52) U.S. Cl. ............... 359/847; 359/846; 359/849

(58) Field of Classification Search ......... 359/846–849
See application file for complete search history.

(56) References Cited

U.S. PATENT DOCUMENTS

| | | | |
|---|---|---|---|
| 2,300,251 A | 10/1942 | Flint | |
| 2,952,189 A | 9/1960 | Pajes | |
| 3,031,928 A | 5/1962 | Kopitko | |
| 3,056,131 A | 9/1962 | Mcreary | |
| 3,610,738 A | 10/1971 | Bochman | |
| 3,687,524 A | 8/1972 | Martinez | |
| 3,757,479 A | 9/1973 | Martinez | |
| 3,877,139 A | 4/1975 | Martinez | |
| 3,880,500 A | 4/1975 | Kojabashian | |
| 4,033,676 A | 7/1977 | Brantley, Jr. et al. | |
| 4,046,462 A | 9/1977 | Fletcher et al. | |
| 4,068,777 A | 1/1978 | Humphrey | |
| 4,130,234 A | 12/1978 | Schmidt | |
| 4,352,112 A * | 9/1982 | Leonhardt et al. | 343/915 |
| 4,540,251 A * | 9/1985 | Yau et al. | 359/846 |
| 4,741,609 A | 5/1988 | Sallis | |
| 4,987,826 A | 1/1991 | Deppert et al. | |
| 5,590,497 A | 1/1997 | Moore | |
| 5,680,262 A | 10/1997 | Soliday et al. | |
| 5,813,830 A | 9/1998 | Smith et al. | |
| 5,990,851 A | 11/1999 | Henderson et al. | |
| 6,065,842 A * | 5/2000 | Fink | 359/846 |
| 6,332,687 B1 | 12/2001 | Carreras et al. | |
| 6,716,017 B2 | 4/2004 | Papadoulas | |
| 6,795,260 B2 * | 9/2004 | Herren et al. | 359/894 |

* cited by examiner

*Primary Examiner*—Joshua L Pritchett (57) ABSTRACT

An improved device for reflecting, radiating, or receiving electromagnetic radiation, acoustic waves, or other energy forms through the use of a membrane stretched across a lightweight, round, frame structure. A near perfectly round and flat semi-rigid backplane surface (1) and a near perfectly round ring or stack of rings (2) are mutually reinforced, forming a raised circumferential planar surface, and a cavity within. A membrane (3) is attached to the top of the rings, forming one wall of a sealed chamber. A source of sub-ambient pressure (4) is applied to the chamber, causing a primary uniform deformation in the membrane for the purpose of manipulating electromagnetic radiation, acoustic waves, or other energy. The backplane surface also deforms uniformly, increasing the strength of the structure. A flat, rigid floating batten (5) prevents waves or wrinkles from forming in the membrane material. A circumferential heating element (6) and insulation (7) provides tensioning of the membrane by slightly controlling the circumference of the device.

6 Claims, 7 Drawing Sheets

Preferred embodiment of a lightweight, strong, reflecting dish utilizing a stretched membrane reflector.

Fig. 1-Preferred embodiment of a lightweight, strong, reflecting dish utilizing a stretched membrane reflector.

Any cross-sectional shape,
Hollow or solid

Any cross-sectional shape,
Hollow or solid

Fig. 2
Near-perfectly
round ring

Fig. 3
Typical oval distortion

Fig. 4
Near perfect planar surface

Fig. 5
Typical distortion
(potato chipping)

Fig. 6
Assembly comprising near perfectly round ring attached to a near-perfectly flat backplane Fig. 7
Membrane attached and sealed, and sub-ambient pressure applied Fig. 8
Membrane attached and sealed, and super-ambient pressure applied Fig. 9
Membrane attached, and super-ambient pressure applied Fig. 10
Wrinkling typical of membrane sheet that is tensioned over a ring.

Fig. 11
Annular floating batten

Fig. 12
Solar thermal circumference adjuster

Fig. 13
Resistance thermal circumference adjuster

STRETCHED MEMBRANE DEVICE

U.S. Patent Documents:

| | | |
|---|---|---|
| 2,300,251 | 1941 | Flint |
| 2,952,189 | 1960 | Pajes |
| 3,031,928 | 1962 | Kopitko |
| 3,056,131 | 1962 | Mcreary |
| 3,610,738 | 1971 | Bochmann |
| 3,687,524 | 1972 | Martinez |
| 3,757,479 | 1973 | Martinez |
| 3,877,139 | 1975 | Martinez |
| 3,880,500 | 1975 | Kojabashian |
| 4,033,676 | 1977 | Brantley, Jr. et al |
| 4,046,462 | 1977 | Fletcher et al |
| 4,068,777 | 1978 | Humphrey, et al. |
| 4,130,234 | 1978 | Schmidt |
| 4,352,112 | 1982 | Leonhardt, et al |
| 4,741,609 | 1988 | Sallis |
| 4,987,826 | 1991 | Deppert, et al. |
| 5,590,497 | 1997 | Moore |
| 5,680,262 | 1997 | Soliday, et al. |
| 5,813,830 | 1998 | Smith, et al. |
| 5,990,851 | 1999 | Henderson, et al. |
| 6,332,687 | 2001 | Carreras, et al |
| 6,716,017 | 2004 | Papadopoulas |

BACKGROUND OF THE INVENTION, AND PRIOR ART

Membranes, esp. polymeric membranes, provide an economical method of presenting large surfaces to electromagnetic, acoustic, or other energy, for the purpose of absorbing, reflecting, focusing, or other manipulation of this energy.

Flint (U.S. Pat. No. 2,300,251, 1941) describes fabricating a lens by using two transparent membranes with a clear fluid between. Focal adjustment is made by mechanically adjusting the frame, or by varying the fluid pressure between the membranes, or diaphragms.

Membranes have also enabled the design of inexpensive mirrors when a membrane is coated with a reflective coating, and then are stretched over a suitable frame.

Martinez (U.S. Pat. Nos. 3,687,524, 3,757,479, and 3,877,139 1972-1975) described a flat "glassless" mirror stretched over a sheet metal "pan".

Additionally, the shaping of such stretched reflective membrane mirrors into a concave or convex lens shape enables the mirror surface to now become a reflective lens with an approximate spherical/parabolic shape useful for radiating, receiving, reflecting or focusing electromagnetic radiation or acoustic waves. A concave shape may be established by applying a vacuum within the sealed chamber formed by the membrane and it's supporting frame. A convex shape can be established by applying a positive pressure within the sealed chamber. For space-based applications where near vacuum ambient conditions exist, a second clear membrane may be placed over the reflective membrane, and positive pressure introduced between the two membranes to induce a concave shape into the reflective inner membrane.

Such designs have been suggested for use in solar concentrating dishes, radio antennas and also for imaging applications such as telescopes and holographic projection.

Prior art with reference to utilizing a stretched membrane material as a lens, or reflective lens include:

Pajes (U.S. Pat. No. 2,952,189, 1960) designed a drum which is evacuated to induce a concave shape.

Kopitko (U.S. Pat. No. 3,031,928, 1962) described a dual diaphragm system and a controlling method to maintain curvature.

Bochmann (U.S. Pat. No. 3,610,738, 1971) depicted an arrangement whereby a diaphragm was pulled by a cam to induce a vacuum, and hence concave shape.

Brantley, Jr. et al, (U.S. Pat. No. 4,033,676 1977) depicted two hoops separated by vertical strut members. The two membranes form a cavity inside the circumference, and membranes also form a pressure barrier around the strut members. The frame function is separate from the sealing pressure barrier.

Kojabashian (U.S. Pat. No. 3,880,500, 1975) described a frame design and a method utilizing two films that equalize the pneumatic forces on the supporting structure.

Soliday, et al. (U.S. Pat. No. 5,680,262 1997) utilizes a tubular frame of square cross section, and describes a tensioning method for the stretched membrane utilizing a plurality of pneumatic cylinders.

Carreras, et al (U.S. Pat. No. 6,332,687, 2001) describe utilizing a vacuum for primary deformation, and also using an outer mechanical ring and central plunger to achieve a more parabolic shape.

Each of these designs utilized some type of frame over which the reflective membrane is stretched:

Pajes (U.S. Pat. No. 2,952,189, 1960) and Bochmann (U.S. Pat. No. 3,610,738, 1971) utilized a drum design.

Kopitko (U.S. Pat. No. 3,031,928, 1962) utilized two parallel plates, with the film stretched at the midpoint.

One problem with previous designs is that although the reflective membrane affords an inexpensive method of presenting and manipulating large surfaces for the purpose of directing electromagnetic radiation or other energy, the framework for the membrane must be very strong to withstand the considerable pneumatic forces required to establish the membrane shape with minimal distortion. The primary aim of the frame is to establish a nearly perfect round shape with a circumferential raised portion that establishes a near perfect plane for the attachment and sealing of a non-porous membrane to the frame structure. An internal cavity is required to allow for the deformation of the membrane material. These past designs often utilized heavy and expensive frames.

Kopitko (U.S. Pat. No. 3,031,928, 1962), and Brantley, Jr. et al, (U.S. Pat. No. 4,033,676 1977), Kojabashian (U.S. Pat. No. 3,880,500,1975), Leonhardt, et al (U.S. Pat. No. 4,352,112 1982), and Soliday, et al. (U.S. Pat. No. 5,680,262 1997) all address this problem by utilizing two membranes with the vacuum or pressure within, thus equalizing much of the resulting forces. This has the disadvantage in that since both membranes stretch, the frame needs to be of considerable width to prevent the two membranes from touching in the middle when a vacuum is applied. Also, the sole structural element becomes the outer ring or drum, which can still oval and warp, distorting the desired focus or other manipulation of the directed electromagnetic or other radiation. The ovaling stress is non-uniform, and also tends to exacerbate the formation of wrinkles or waves in the membrane surface.

Inflatable systems eliminate much of the weight problem, and add a portability function, but tend to experience more distortion.

Mcreary (U.S. Pat. No. 3,056,131, 1962) circumvents the frame with an inflatable dish with reflective material on the back side, and transparent material at the front.

Wladimir von Maydell et al. (U.S. Pat. No. 3,326,624) describes an inflatable mirror for use in space-based applications.

One object of this invention that is believed to solve many of these problems is an improved frame design, utilizing a combination of two basic geometric shapes (a ring and a flat plane) which are mutually reinforced to arrive at a light-weight, rigid and true structure for supporting the stretched membrane.

Leonhardt, et al (U.S. Pat. No. 4,352,112 1982) describe utilizing a circumferential ring or rings with a vertical member to increase height in a drum-like arrangement. The ring or rings, however are described with two membrane surfaces forming the top and bottom walls of the structure.

Ring reinforcement has been applied in the past for a wide variety of unrelated applications, such as rolling a lip into the rim of a paper cup, a formed lip of a jar lid, and as with the molded lip on a container or with flying discs:

Schmidt (U.S. Pat. No. 4,130,234, 1978) and others discuss improved methods of rolling a lip surface into a cup design for greater strength. The goal here is to economically increase the strength of the rim.

Sassak (U.S. Pat. No. 5,116,275, 1992) discusses a flying toy with a reinforcing lip, but molded in.

Weiss (U.S. Pat. No. 5,366,403, 1994) discusses utilizing a reinforcing ring to convert a disposable plate into a flying toy.

Gilliam, et al. 6,761,283 2004 and others describe molding a lip, or "brow ridge" into a container and closure for same as a way of increasing the strength.

The primary function of the ring in this invention is unique—to provide mutual reinforcement along with a backplane element for the purpose of establishing a nearly perfect round shape with a circumferential raised portion that establishes a near perfect planar surface for the attachment and sealing of the membrane. Further, the application of negative or positive pressure inside the proposed structure causes a uniform warpage of the backplane element, increasing the strength of the structure without distortion of the manipulated electromagnetic, acoustic, or other energy.

Another object of this invention are methods of preventing wrinkles when a stretched membrane (esp. of polymeric material) is tensioned in multiple directions, as when it is stretched over a frame in a uniform manner, and then pneumatically deformed.

Sail battens have been utilized for minimizing wrinkling of sails, and also for shaping sails into an ideal aerodynamic form. Also similar to this invention, sail battens float on (are solely support by) the stiffened sail surface.

Mauney (U.S. Pat. No. 2,743,510 1956) describes an inflatable batten, and also one that forms an arc, but not a complete circle Leonhardt, et al (U.S. Pat. No. 4,352,112 1982) describes prestressing a diaphragm in order to eliminate folds, and also discusses various reinforcing strips for the purpose of altering the stressed membrane configuration. The reinforcing ring depicted forms only an arc, and is not completely annular.

Henderson (U.S. Pat. No. 5,333,569 1994) describes an inflatable sail batten

Baird (U.S. Pat. No. 5,095,837 1992) describes a ram air inflatable form for a spinnaker sail, again with a curved surface, but not a completely round surface.

None of this prior art relates to preventing wrinkles in 360 degree round structure through the use of a circumferential batten.

Another object of this invention is to provide a means of uniformly tensioning the reflective membrane without inducing distortion via the application of heat to the circumference of the ring. Ambient temperature changes may affect the membrane material in a different way than the supporting structure, due to differences in thermal coefficient of expansion. The membrane may remain tightly stretched at one ambient temperature, but become loose when the ambient temperature is lowered, or vica versa. This problem increases as the size of the structure increases.

Martinez (U.S. Pat. Nos. 3,687,524, 3,757,479, and 3,877,139 1972-1975) described a method of tensioning a membrane mirror surface through the application of heat to shrink the film. This is a one-time manufacturing process, however, as opposed to a method of controlling the tension to accommodate changing ambient temperatures.

Sallis, (U.S. Pat. No. 4,741,609 1988) described a tensioning method for a membrane reflector utilizing an inflatable bladder, but no thermal component is mentioned.

Deppert, et al. (U.S. Pat. No. 4,987,826 1991) describes a dynamic thermal tensioning method for a piston rod-to-cylinder sealing ring, but utilizing a fluid filling medium.

Moore (U.S. Pat. No. 5,590,497 1997) discussed mechanical circumferential tensioning of prestress cables in a concrete tank.

Smith, et al. (U.S. Pat. No. 5,813,830 1998) utilizes springs for circumferential tensioning of a carbon seal containment barrier system inside a turbine engine.

Henderson, et al. (U.S. Pat. No. 5,990,851 1999) discusses circumferential tensioning of a space-based antennae, but not by thermal means.

Papadopoulas (U.S. Pat. No. 6,716,017 2004) discusses circumferential tensioning of an embossing roll, but not by thermal means.

BRIEF DESCRIPTION OF THE INVENTION

The principle object of this invention is to provide an improved device for reflecting, radiating, or receiving electromagnetic radiation, acoustic waves, or other energy forms through the use of a membrane stretched across a lightweight, round, frame structure. The primary purpose of the structure is to establish a nearly perfect round shape with a circumferential raised portion that establishes a near perfect plane for the attachment of a membrane. The structure primarily consists of two basic geometric shapes—a flat semi rigid planar surface attached to a circumferential ring or stack of rings. The flat planar surface and circumferential ring(s) provide mutual reinforcement, and result in an internal cavity which may be utilized for clearance to permit the deformation of the said stretched membrane covering the cavity.

Further, the resulting shape becomes more rigid as vacuum or pressure is placed inside the sealed area between the structure and the reflective membrane. The primary concave or convex deformation is induced into the reflective membrane, but the semi-rigid backplane will also warp slightly and uniformly into a near-perfect concave or convex shape that is stronger and more rigid than the unstressed structure without causing significant distortion of the desired membrane manipulation. Further, the minimal concavity induced on a semi-rigid backplane minimizes the depth required of the supporting structure.

Another object of the invention comprises a unique method of preventing wrinkles that typically form in the periphery of the reflective membrane surface as it is deformed. Many planar materials, and especially polymeric materials, will develop large wrinkles or waves when tensioned into a concave or convex shape about a circular frame. These large wrinkles or waves scatter the object radiation, acoustic, or other energy away from the desired direction. This invention inhibits the propagation of these wrinkles or waves through the attachment of a flat, rigid "floating batten". This stiffening batten has a circumference slightly less than that of the main structure, is solely supported by the membrane itself, and inhibits the wrinkles from propagating from the outside circumference inward.

Another object of the invention provides a unique method of thermally tensioning the stretched film membrane by applying heat circumferentially around the ring or rings. The ring heats up, expanding in a uniform manner, while the film remains at ambient temperature. Circumferential tensioning is uniform, minimizing the distortion of the desired manipulation of electromagnetic, acoustic or other energy. Method of circumferential heating may be via solar radiation, resistance heating, or other method of generating heat.

DETAILED DESCRIPTION OF THE INVENTION

Figure 1:
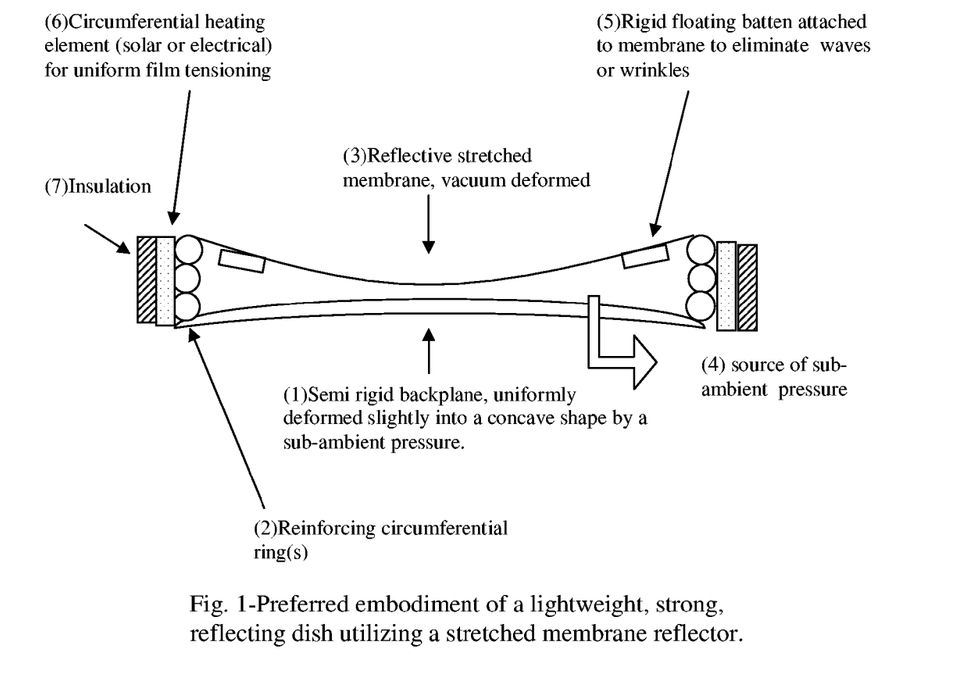
FIG. 1 is a drawing depicting cross-sectional view the overall preferred embodiment of the invention.

As shown in the drawings, the preferred embodiment in accordance with the present invention is an improved stretched membrane device for reflecting, radiating, or receiving electromagnetic radiation, acoustic waves, or other energy forms through the use of a membrane stretched across a lightweight, round, frame structure. The preferred embodiment, depicted in FIG. 1 comprises a round frame consisting of (1) a near perfectly round and flat semi rigid foamboard backplane element attached to (2) a stack of near perfectly round circumferential reinforcing ring elements. A reflective membrane element (3) consisting of a non-porous reflective material is stretched across the cavity formed by the structure, and attached to the circumferential ring, thereby forming one wall, and sealing said cavity. A vacuum (4) is placed into to cavity, causing a primary uniform concave deformation of the reflective membrane for the object of manipulating said forms of electromagnetic, acoustic, or other energy. The vacuum also induces a slight, uniform convex shape into the semi-rigid backplane material that increases the total strength of the frame structure with minimal distortion of the object manipulations of energy. An annular floating batten element (5) of slightly less diameter than the frame is attached to and solely supported by the reflective membrane, and prevents the propagation of large wrinkles or waves that form in the reflective membrane as it is tensioned by the application of vacuum. A circumferential heater (6) of solar or other source is provided to induce a uniform growth or shrinkage to the reinforcing ring, thereby evenly tensioning the reflective film, again with minimal distortion. Insulation (7) is applied over the heated rings for the purpose of retaining heat.

FIGS. 2-7 provide an understanding of the problems of fabricating a large supporting frame structure for the embodiment, and also the advantages of this improvement.

Figure 2:
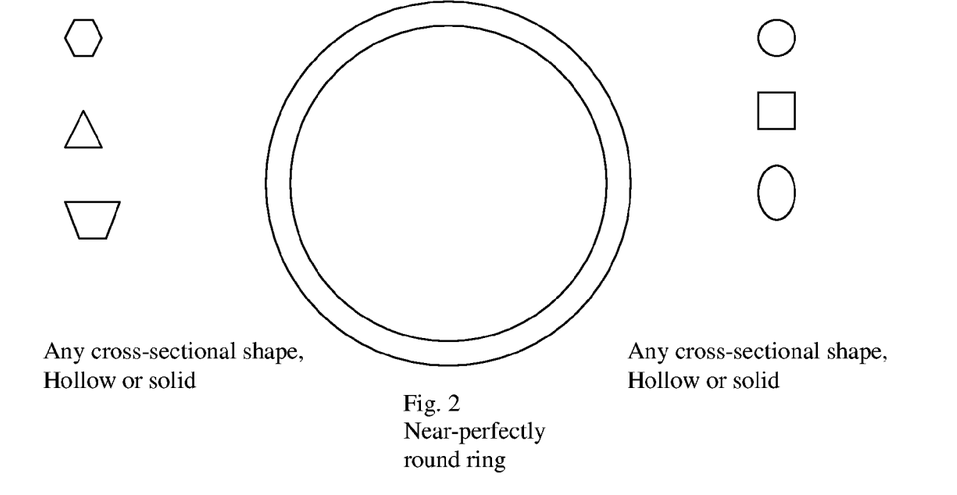
FIG. 2 depicts a near-perfect ring, which may be constructed of any material, may be solid or hollow, and it may have a round, square, or any other cross sectional shape
Figure 3:
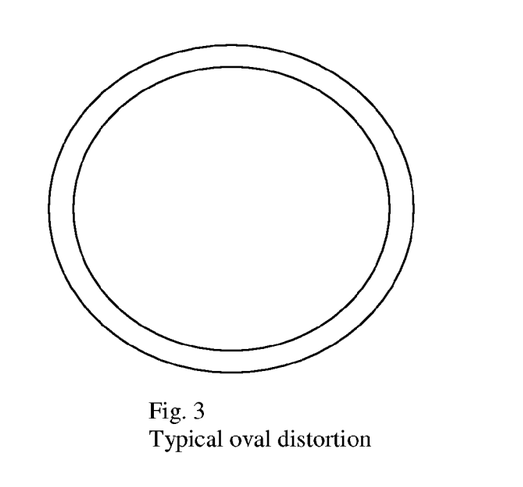
FIG. 3 depicts a typical deformation or ovaling of said ring into an out of round condition, due to it's own weight, unbalanced forces of a mechanical, pneumatic, hydraulic, electromagnetic, or other nature.

FIG. 2 depicts a typical ring element. The ring may constructed of any material, may be hollow or solid, and may be of any cross sectional area. FIG. 3 depicts an oval distortion typical of a ring when gravitational, mechanical, pneumatic or other forces are applied to it.

Figure 4:
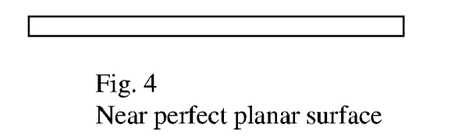
FIG. 4 depicts a planar backplane material that forms a near-perfect flat surface.

FIG. 4 depicts a round, flat planar surface which may be constructed of foamboard, cardboard, plywood, or honey-combed material with backing.

Figure 5:
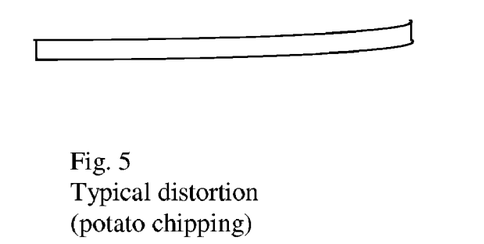
FIG. 5—Again, stresses of a gravitational, mechanical, pneumatic, hydraulic, electromagnetic, or other source can easily cause this backplane material to warp or "potato chip" out of the near perfect flat shape.

FIG. 5 depicts typical distortion, non-uniform warpage, or "potato chipping" that can occur from gravitational, mechanical, pneumatic or other forces are applied to it, and also by the absorption of moisture or other fluids into the material.

Figure 6:
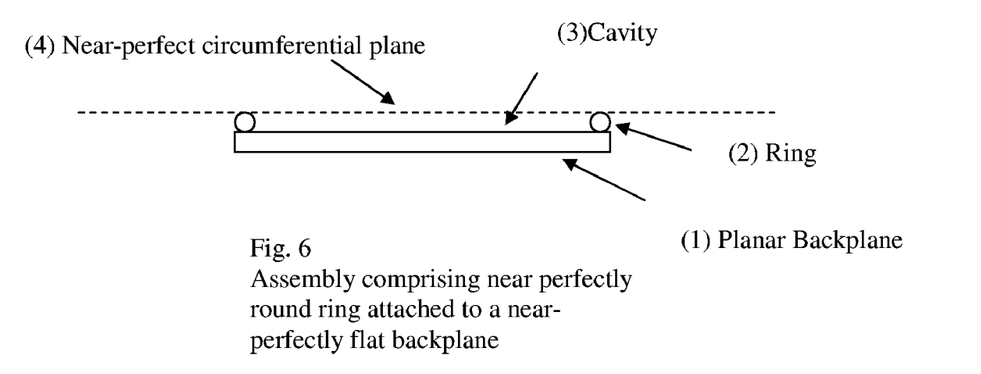
FIG. 6 depicts an assembly whereby a near-perfect ring is attached to a near-perfect flat structure, or backplane whereby the backplane prevents ovaling of the ring, and the ring inhibits warping of the backplane, creating a near-perfect circumferential raised planar surface, and also resulting in an internal cavity.

FIG. 6 depicts an assembly whereby a near perfectly round ring (2) as depicted in FIG. 2 is solidly attached to a near perfectly flat backplane surface (1) as depicted in FIG. 4. The circumferential rigidity imparted by the ring inhibits the distortion in the backplane element noted in FIG. 4, and the backplane material inhibits ovaling of the ring or rings element as shown in FIG. 2. The resulting assembly results in a nearly perfect round shape with a circumferential raised portion that establishes a near perfect plane (4) for the attachment and sealing of a membrane. An internal cavity (3) is formed by this assembly, which provides clearance for the uniform deformation of the said membrane.

Figure 7:
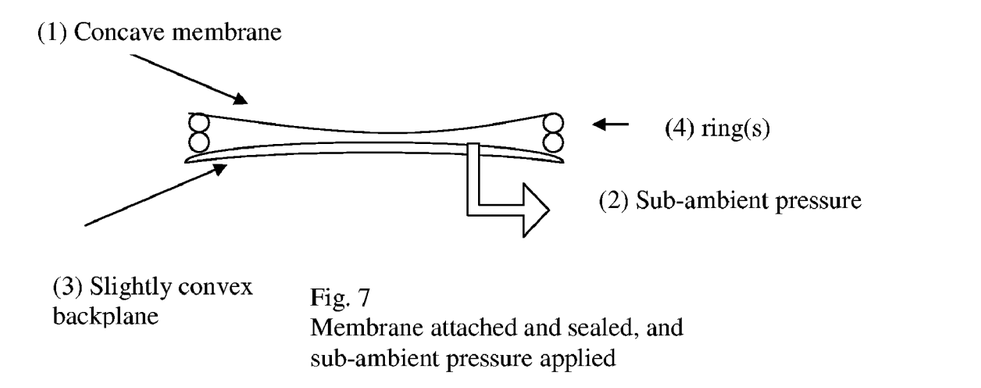
FIG. 7 depicts the same assembly as in FIG. 6, but with a stack of reinforcing rings, and a non-porous membrane stretched across it, and sub-ambient pressure applied to the interior of the assembly, causing a primary deformation into the membrane, and a slight secondary but uniform deformation into the semi rigid backplane material.

FIG. 7 depicts an assembly with a stack of rings (4) with a means of attaching them to the backplane and to each other, providing additional depth to the cavity, and a non-porous membrane (1) attached and sealed to the circumferential plane established across the top, forming a sealed cavity into which a sub-ambient pressure (2) may be applied and held. Said sub-ambient pressure causes a primary uniform concave deformation in the membrane material, and also causes a slight but uniform convex deformation in the semi rigid backplane material (3), which increases the strength of the total assembly without inducing significant distortion to the membrane or to the object manipulation of the said electromagnetic, acoustic, or other energy.

Figure 8:
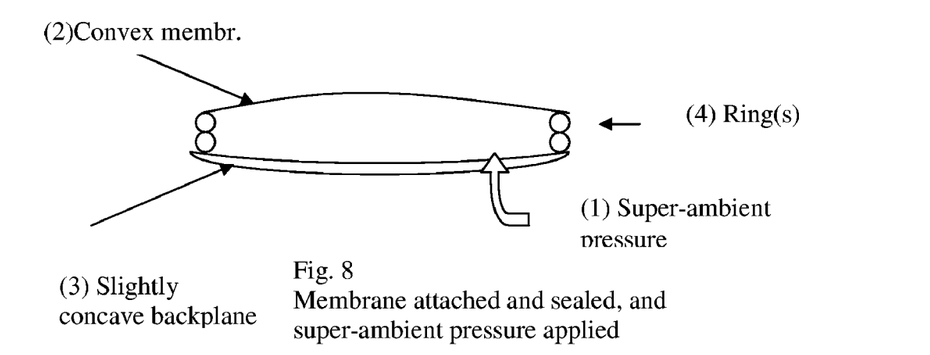
FIG. 8 depicts the same assembly as FIG. 7, but with a super-ambient pressure applied, causing a convex deformation of the membrane, and a slight uniform concave deformation of the backplane element.

FIG. 8 depicts an assembly with a stack of rings (4) providing additional depth to the cavity, and a non-porous membrane attached and sealed across the top, forming a sealed cavity into which a super-ambient pressure (1) may be applied and held. Said super-ambient pressure causes a primary uniform convex deformation in the membrane material (2), and also causes a slight but uniform concave deformation in the semi rigid backplane material (3), which increases the strength of the total assembly without inducing significant distortion to the membrane, or to the object manipulation of the said electromagnetic, acoustic, or other energy.

Figure 9:
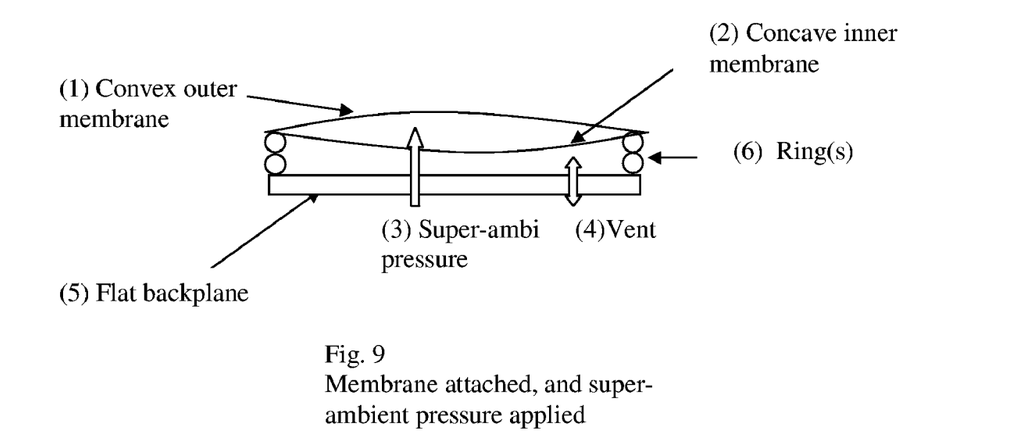
FIG. 9 depicts a dual membrane assembly with super-ambient pressure applied between the two membranes.

FIG. 9 depicts an assembly with a stack of rings (6) providing additional depth to the cavity, and two non-porous membranes attached and sealed across the top. Super-ambient pressure (3) may be applied and held between the two membranes, causing a convex manipulation of the outboard membrane (1), and a concave manipulation of the inboard membrane (2). The cavity between the inboard membrane and the backplane element is vented (4). Backplane element (5) remains flat in this instance. Such an arrangement would be advantageous in forming an optical lens by using two transmissive membranes. Another use would be for a space-based reflective lens with an outboard transmissive membrane, and a reflective inboard membrane.

Figure 10:
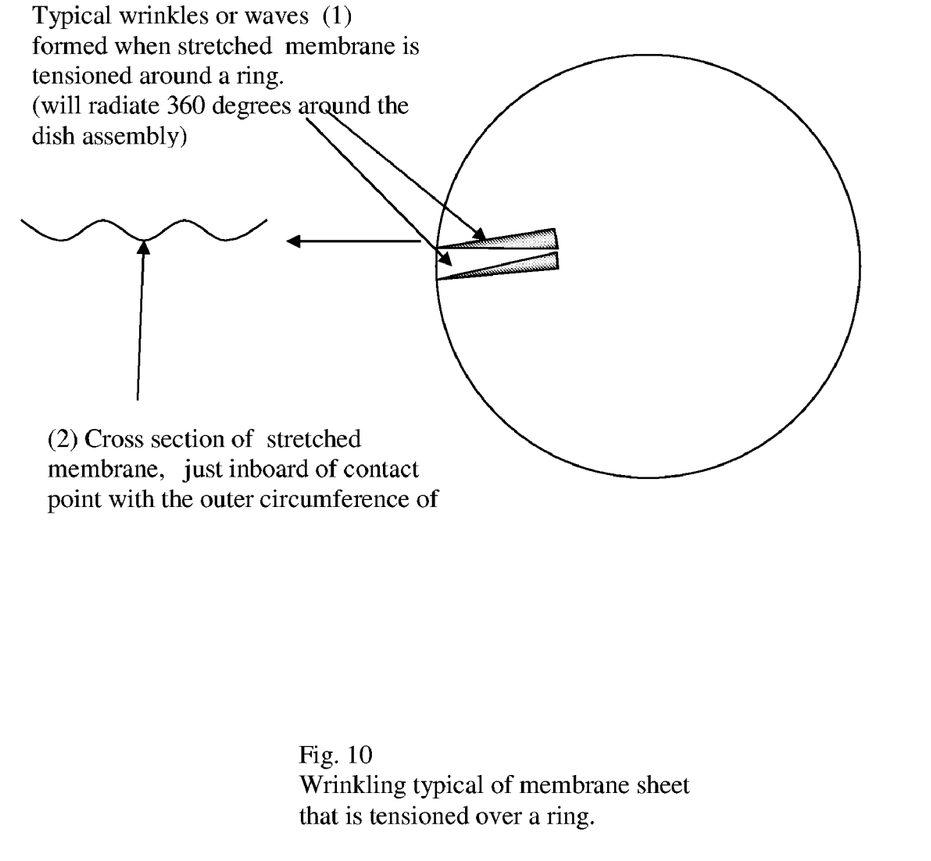
FIG. 10 depicts large radial wrinkles or waves that typically form when a stretched membrane is tensioned in more than one direction, as, for example, when a sub or super-ambient pressure is applied.

FIG. 10 depicts large wrinkles or waves (1) that form in membrane films when tensioned in multiple directions, such as in FIG. 7, when a sub-ambient pressure is applied inside the sealed cavity. Many membrane materials display some small amount of elasticity when tensioned uniformly in one direction. When tension is simultaneously applied to said membrane in more than one direction, however, large wrinkles or waves form at the circumference of the membrane, and radiate inward. These waves or wrinkles display maximum amplitude (2) just inside the circumference, and decreasing amplitude as the deformation progresses toward the center. Said wrinkles or waves in the membrane material direct the object electromagnetic, acoustic, or other energy away from the desired manipulation.

Figure 11:
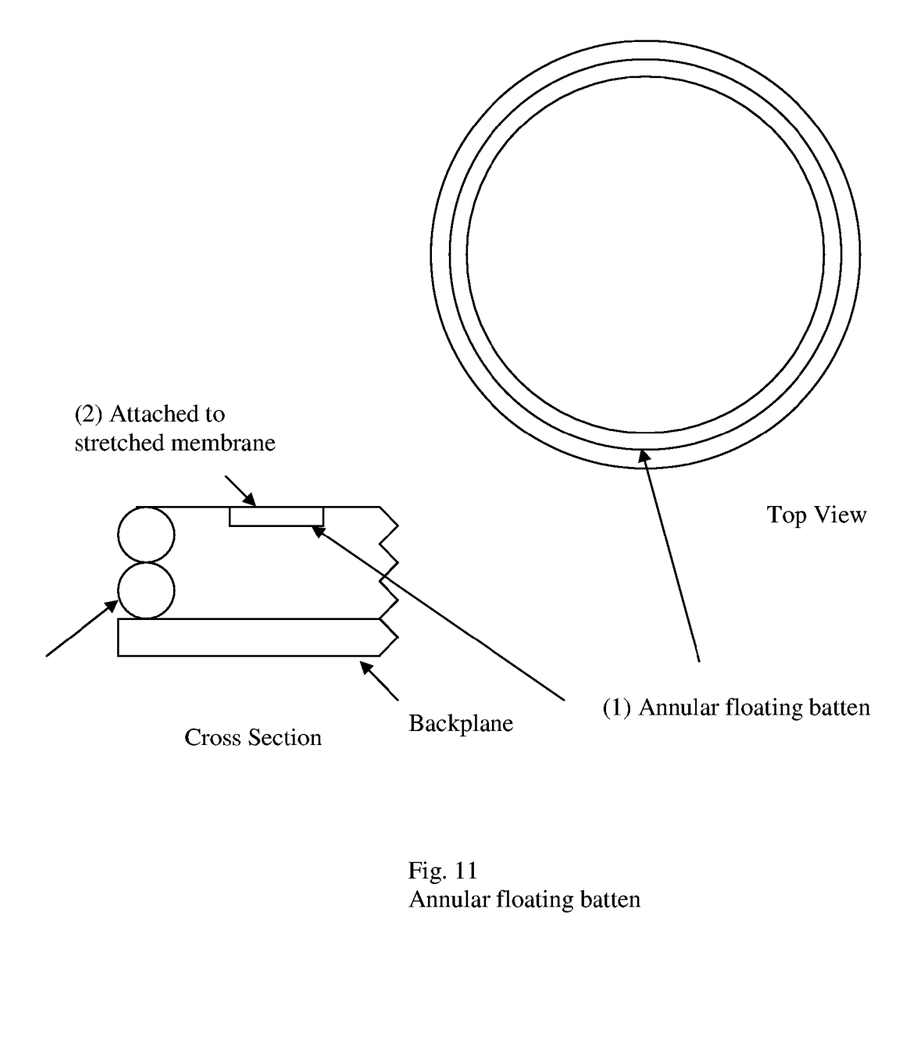
FIG. 11 depicts a method for minimizing the large wrinkles or waves depicted in FIG. 7 via a round, flat, rigid batten attached to, and wholly supported by the stretched membrane.

FIG. 11 depicts a unique circular, flat, rigid annular batten (1) of slightly less diameter than the structure that it is firmly attached to, and solely supported by the reflective membrane (2). This floating annular batten inhibits the propagation of said waves or large wrinkles.

Figure 12:
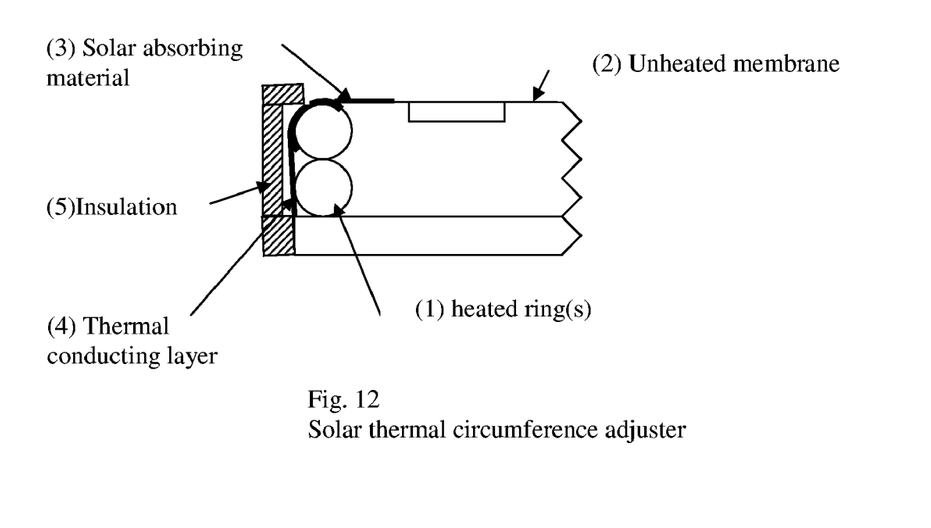
FIG. 12 depict a thermal circumference adjuster, utilizing the application of heat circumferentially to the ring surface with a solar absorbing material, a heat conductive layer, and an insulating layer on top.

FIG. 12 depicts a unique method of thermally tensioning the stretched film membrane by applying heat circumferentially around the ring or rings. The ring(s) (1) heat up, expanding in a uniform manner, while the film (2) remains at ambient temperature. Circumferential tensioning minimizes deformation of the reflective membrane and also of the desired manipulation of electromagnetic, acoustic or other energy. FIG. 12 depicts a solar absorbing material (3) attached to the outer face of the reflective membrane. A conducting material (4) underneath carries the heat generated to the outer diameter of the rings. An insulating layer (5) is applied on top to prevent heat loss.

Figure 13:
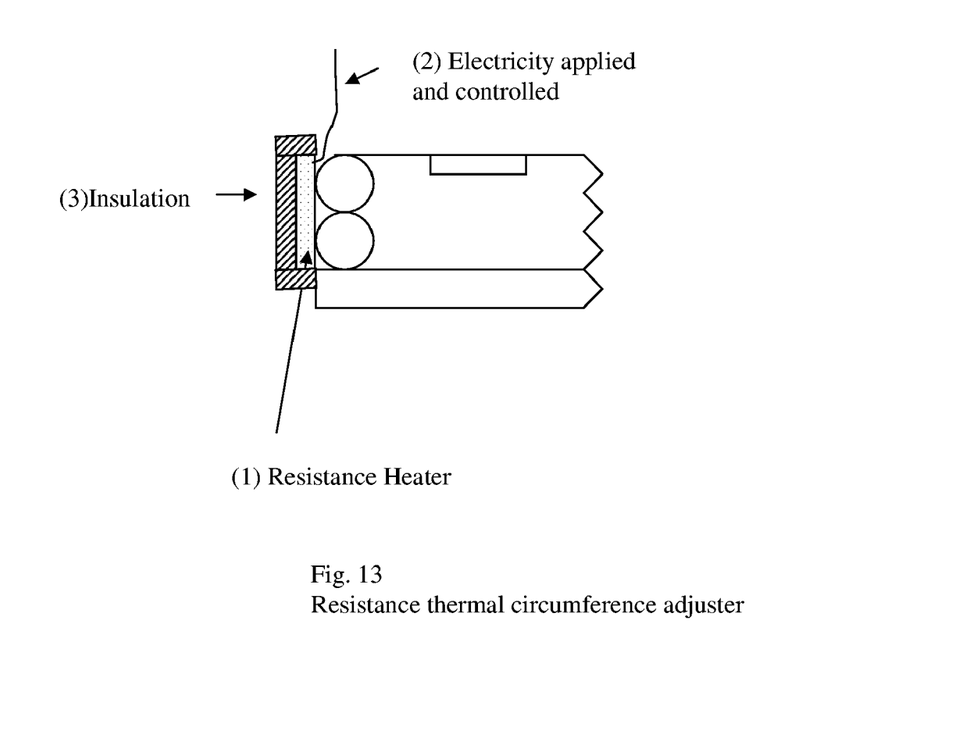
FIG. 13 illustrates another thermal circumferential adjuster utilizing a resistance heater around the circumference, again with an insulating layer above to retain heat.

FIG. 13 depicts another method of applying circumferential heat via an electrical heating element. An electrical resistance heater element (1) is attached circumferentially to the ring(s), electricity is applied and controlled (2), and an insulating layer (3) is provided to prevent heat loss.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An improved design for a reflector, radiator, or receiver of electromagnetic, acoustic, or other energy, comprising
    a frame structure that provides a near-perfectly round shape with a raised planar circumferential surface, and creating an internal cavity within,
    a non-porous reflective, transmissive, translucent or opaque membrane or plurality of membranes,
    a means of attaching and sealing said membrane material to said raised planar surface, and to each other in the case of multiple membranes, such that a sealed cavity results between said frame structure and said membrane or membranes,
    a means of applying sub-ambient or super-ambient pressure to said sealed cavity,
    deforming said membrane or membranes thereby resulting in membrane deformations which are capable of manipulating electromagnetic, acoustic, or other energy, wherein improvements are comprised of
    a near perfectly flat and round semi rigid planar structural surface element, having parallel opposed major faces with predetermined distance between them, and predetermined fill material contained within
    a near perfectly round ring element or plurality of ring elements that provide circumferential reinforcement, having a predetermined cross-sectional shape, being of a predetermined material, and having a predetermined rigidity,
    a means of attaching said planar surface to said ring, and said rings to each other, thus forming a near-perfect raised circumferential planar surface with an internal cavity,
    a means of attaching and sealing said membrane or plurality of membranes to said circumferential planar surface, and also to each other,
    a means of applying sub ambient or super ambient pressure, thereby resulting in membrane deformations which are capable of manipulating electromagnetic, acoustic, or other energy, and thereby also inducing a lesser convex or concave deformation into the semi-rigid structural planar backplane material
    a means of inhibiting wrinkles in said non-porous membrane elements comprising
    a circular floating batten element, formed inside the circumference of said membrane element comprised of
    an annular, flat, batten of slightly less circumference than the membrane, of a predetermined material, of a predetermined width and thickness, with a predetermined rigidity, and constructed as one piece, or in sections,
    a means of attaching said batten to said membrane or membrane elements with a predetermined strength and flexibility, such that said batten is solely supported by said non-porous membrane element a means of dynamically tensioning said non-porous membrane or plurality of membranes.

2. The apparatus of claim 1 wherein said round frame structure for use in supporting said membrane is comprised of a near perfectly flat and round semi rigid planar surface element, a near perfectly round ring or stack offing elements that provides circumferential reinforcement, being of any material, being hollow or solid, and with any cross sectional shape, a means of attaching said planar surface to said ring or rings, thus forming a near-perfect raised circumferential planar surface with an internal cavity, a means of attaching and sealing a membrane to said circumferential planar; surface, a means of applying sub ambient or super ambient pressure for the purposes of inducing a uniform concave or convex deformation to the membrane surface for the purpose of reflecting, radiating, receiving or other manipulations of said electromagnetic, acoustic, or other energy, and also inducing a strengthening uniform convex or concave deformation into the semi-rigid backplane material.

3. The apparatus of claim 1 wherein said round frame structure for use in supporting said membrane is comprised of a near perfectly flat and round semi rigid planar surface element, a near perfectly round ring or stack of ring elements with any cross sectional shape that provides circumferential reinforcement, a means of attaching said planar surface to said ring or rings, thus forming a raised circumferential planar surface with an internal cavity, a means of attaching and sealing two membranes to said circumferential planar surface, a means of applying super ambient pressure between the inboard and outboard membranes for the purpose of inducing a uniform convex deformation in the outboard membrane, and for inducing a concave deformation to the inboard membrane Surface for the purpose of said reflecting, radiating or receiving or other manipulations of said electromagnetic, acoustic, or other energy, and providing a means of venting the area between the inboard membrane and the backplane material.

4. The means of dynamically tensioning said non-porous membrane or plurality of membranes of claim 1, comprising a thermal size adjuster for uniformly adjusting the circumference of said round structure, comprised of a circumferential heating element a means of attaching said heater to said circumferential ring or rings, an insulating material to minimize the heat loss from said heater a means of attaching said insulating material to ring or rings.

5. The apparatus of claim 4, wherein the method of applying heat is solar, comprising
 a solar absorbing material attached to the outer face of the membrane material,
 a means of attaching said solar absorbing material,
 an underlying heat conductive material to conduct heat from the solar absorbing material to the ring or stack of rings,
 an insulating layer covering the portion of said underlying heat conductive material not already covered by the solar absorbing material.

6. The apparatus of claim 4, wherein the method of applying heat is an electrical resistance heater, comprised of
 a circumferential resistance heater,
 a means of attaching said circumferential heater to the circumference of the said round frame structure,
 a means of applying and controlling electricity to said resistance heater an insulating layer covering the circumferential heater and underlying layers.

* * * * *